INVENTOR
JEAN GUILLOTIN
BY
Woodhams Blanchard & Flynn
ATTORNEYS

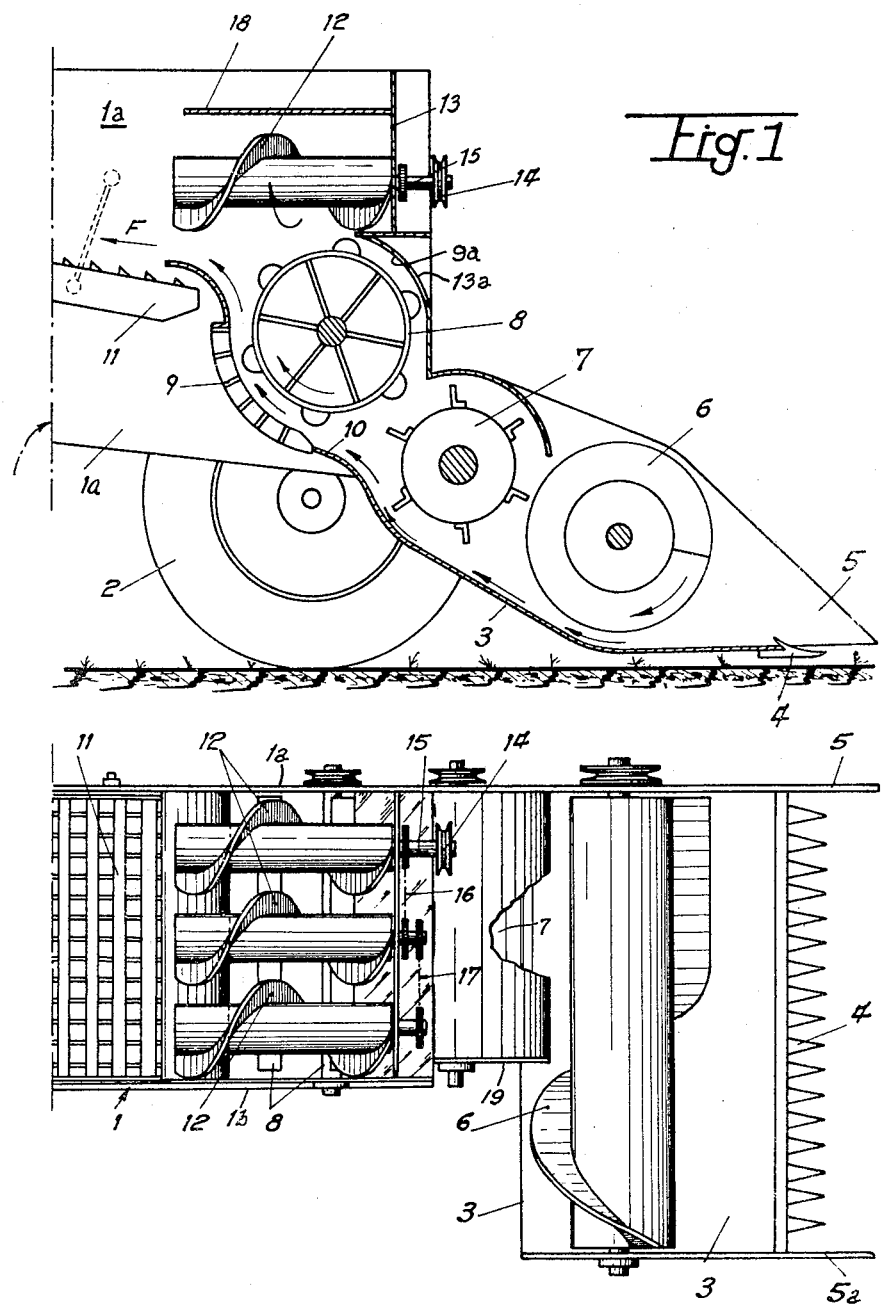

Jan. 18, 1966 J. GUILLOTIN 3,229,696
STRAW FEED MECHANISM FOR COMBINE
Filed Jan. 7, 1965 3 Sheets-Sheet 3

INVENTOR
JEAN GUILLOTIN
BY
Woodhams Blanchard & Flynn
ATTORNEYS

United States Patent Office 3,229,696
Patented Jan. 18, 1966

3,229,696
STRAW FEED MECHANISM FOR COMBINE
Jean Guillotin, Gael, France, assignor to Societe de Recherches et d'Exploitation d'Inventions Guillotin, Gael, France, a company of France
Filed Jan. 7, 1965, Ser. No. 425,677
Claims priority, application France, Dec. 20, 1961, 882,599, Patent 1,316,640
1 Claim. (Cl. 130—27)

This is a continuation-in-part of my application Serial No. 245,183, filed December 17, 1962, for Improvements in Threshing Machines, Harvester-Threshers and Similar Machines, now abandoned. The present invention relates to threshing machines, harvester-threshers and similar machines of the type comprising a rotary beater drum in which the axis of rotation is usually horizontal, and a shaker which receives the grain to be threshed as it is delivered from the beater drum.

It is known, in machines of this type, to mount in parallel relation to the beater drum, opposite the delivery side of this latter, a rotary element with blades, which is commonly referred to as a "straw-puller" and which has the allotted function of co-operating in the extraction of the grain kernels from the grain which is expelled by the beater drum, and to throw the grain onto the shaker. This device nevertheless has serious disadvantages.

In particular, if a relatively rapid rotary movement is imparted to a blade-type straw-puller in order to carry out an effective extraction of the grain kernels from the grain which passes out of the beater drum, the grain is projected too far to the rear of the shaker and especially the grain which still contains kernels on the straw. This circumstance renders the front part of the shaker practically useless so that it is necessary, in order to avoid loss of grains, to increase the length of the shaker to a substantial extent and, correlatively, the over-all corresponding dimension of the whole machine.

On the other hand, if the speed of rotation of the straw-puller is reduced, there results an imperfect extraction of the grain kernels from the grain, which is delivered from the beater drum, and a tendency on the part of this latter to "clog." In the case of certain crops which are particularly dense and/or humid, the clogging problem is not eliminated in a consistent or uniform manner, even if the blade-type straw-puller is caused to rotate at a high speed.

The present invention has for a primary object the provision of an improved machine of the type referred to above which can overcome the said disadvantages. To this end, this invention essentially consists in arranging above the beater drum outlet at least one rotary screw-type conveyor or conveyor worm having its axis substantially perpendicular to the axis of the beater drum and the delivery end extending in the direction of the shaker. Moreover, at least part of said conveyor is located near and directly above said beater drum.

It is found that the screw conveyor which is arranged in this manner draws the grain which passes out of the beater in a manner which is both uniform and very effective, thereby eliminating any danger of clogging even in the case of dense and humid crops. In addition, the said conveyor discharges the grain, the separated kernels and the straw onto the front part of the shaker and in so doing produces practically no projection of grain towards the rear of the shaker, thereby making it possible to reduce the length of the said shaker and, consequently, the over-all length of the machine. It is a remarkable fact, moreover, that these results are achieved without any tendency on the part of the conveyor to break the straw, which is contrary to what takes place when using blade-type or arm-type straw-pullers, especially when these latter rotate at a relatively high speed so that they whip or beat the straw as it departs the drum.

In the practical application of the invention, there may be provided, according to the axial length of the beater drum, either a single screw conveyor or a number of such conveyors arranged parallel to each other and suitably spaced apart above the beater drum.

The screw conveyor or conveyors can be mounted in cantilevered or overhung positions on a wall of the machine frame parallel to the axis of the beater drum for rotation by any appropriate means. The direction of rotational movement of said conveyors must be such that the grain which is drawn in by the action of the screws is discharged onto the shaker.

In the case of machines fitted with a shaker which extends longitudinally from the rear of the beater drum, said shaker can have a width which is substantially equal to the length of the beater drum or, if possible, a width which is even appreciably greater, thereby making it possible to increase the efficiency of said shaker.

Various embodiments of the present invention, as applicable to threshers and the like, have been illustrated in the accompanying drawings by way of nonlimitative example. In these drawings:

FIGURE 1 is a broken side view of the front part of a harvester-thresher in which the beater drum is disposed transversely to the direction of forward motion of the machine and which is provided with the improvements in accordance with the invention, the nearest side wall of the machine being broken away to reveal the interior thereof.

FIGURE 2 is a plan view of the same machine with parts of the top of the machine having been removed or broken away.

Figure 3:
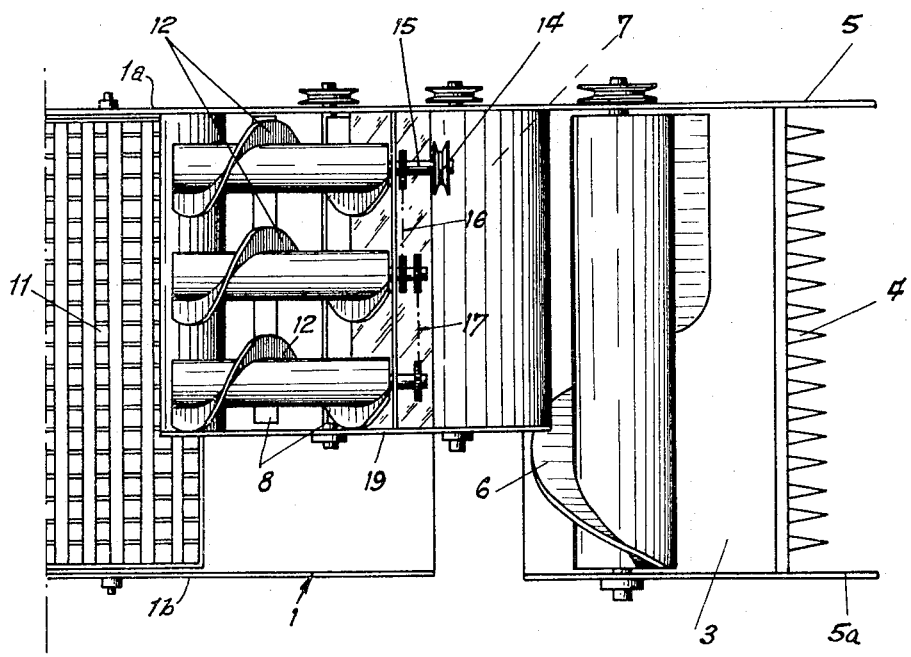
FIGURE 3 is a plan view, similar to FIGURE 2, of a machine fitted with a shaker having a width which is greater than the length of the beater drum.

In the example which has been illustrated in FIGURES 1 and 2, reference numeral 1 designates the frame of a threshing machine proper which is in this case mounted on wheels such as the wheel 2. There is joined to the front end of said frame 1, in a well known manner, the frame 3 of a harvester, the cutter bar of which is shown at 4 between the side walls 5, 5a. The conventional reel and bars have not been illustrated.

The grain, which is cut by the cutter bar 4, is displaced laterally by a screw conveyor or worm 6 of the usual type and is then moved at the end of such travel by a rotary catcher 7 upwardly along the lower wall 10 of the frame 3 to the beater drum 8 which is comprised, in a manner which is also known, of a rotary drum with spaced parallel crossbars mounted on the periphery thereof. The rotational axis of the drum is located transversely to the direction of forward motion of the machine in this particular embodiment. The beater drum 8 is adjacent to, and co-operates with, a concave or grate 9 which extends from the upper and rearward end of the bottom wall 10, so that said concave is located on the lower rearward side of the drum. Said bottom wall 10 is joined in appropriate manner to, and extends between, the side walls 5, 5a of the frame 3 of the harvester.

The reference 11 designates the shaker or straw rack which is suspended substantially horizontally in the usual manner from and within the frame 1 of the thresher for oscillatory or reciprocable movement. The width of the shaker 11 in this case is substantially equal to the length of the beater drum 8. The customary cleaning devices have not been illustrated in the drawings.

In accordance with the invention, one or more screw-type conveyors 12 are mounted above the beater drum 8 preferably at right angles to the axis of the latter. There are in this this example, three conveyors 12 which are arranged in such manner as to define cylinders which cover practically the entire length of the beater drum. Said screw conveyors are journaled in overhung positions upon the transverse front wall 13 of the thresher frame so that they extend rearwardly over the beater drum 8 adjacent the upper surface thereof. The front wall 13 includes an arcuate wall portion 13a which is adjacent the upper front portion of the beater drum 8, preferably on the diametrically opposite side of the drum 8 from the concave 9. Thus, in this instance, the wall portion 13a, the concave 9a and the side walls 1a and 1b of the frame 1 define an upwardly and rearwardly opening passageway into which the grain is delivered by the catcher 7.

Both the catcher 7 and the drum or threshing cylinder 8 are preferably rotated in clockwise directions as appearing in FIGURE 1 so that the grain, straw and grain kernels are moved upwardly along the wall 10 and across the concave 9. The wall portion 13a counteracts the tendency of the grain, under some conditions, to pack on and/or rotate around with the drum 8 after said grain has reached the upper and end of the passageway 9a.

The conveyors 12 preferably extend rearwardly of the thresher frame 1, from points directly above and adjacent the wall portion 13a, across the upper end of the passageway 9a to points directly above the front end of the shaker 11.

The screw conveyors 12 are rotated by an appropriate driving unit (not illustrated in the drawings), which may comprise a conventional belt transmission connected to a driving pulley 14 keyed on the shaft 15 of one of said conveyors. Said shaft 15 may be coupled to the shafts of the other conveyors by means of chain transmissions 16 and 17, or the like, as shown in FIGURE 2. The screw conveyors 12 must be rotated so that the material delivered to them by the beater drum is accordingly moved in the direction of the arrow F (as shown in FIGURE 1) so as to be discharged onto the shaker 11.

There can be arranged above the screw conveyors 12 a guard plate 18 (as shown in FIGURE 1), to prevent any possibility of a build-up thereon.

In the alternate form of the machine shown in FIGURE 3, the same reference numerals designate the same elements as in FIGURE 1. The alternate machine differs from the previously described example only in that the frame 1 and the shaker 11 have widths which are substantially greater than the length of the beater drum. Thus, the intermediate wall 19, which merely covers one side of the catcher 7 in FIGURE 2, is extended rearwardly in FIGURE 3 to cover also the side of the machine containing the beater drum 8 and the conveyors 12. This arises from the obvious fact that the beater drum 8 and the combined assembly of screw conveyors 12 are housed in a space of narrower width than the expanded distance between the lateral walls 1a and 1b of the frame 1.

Figure 4:
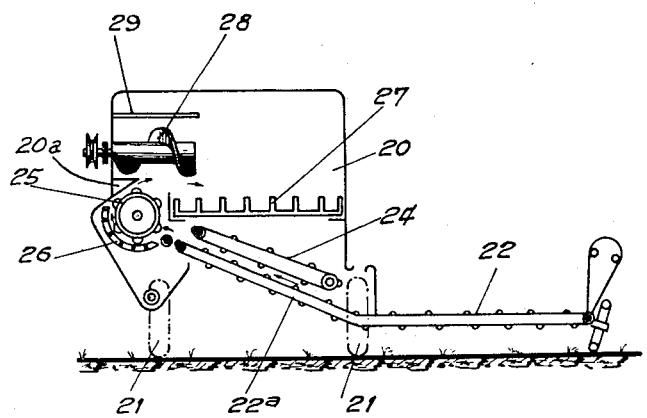
FIGURES 4 and 5 are respectively diagrammatic views of elevation and in plan showing an application of the invention to a harvester-thresher of the sidereaper type with the beater drum disposed parallel to the direction of forward motion of the machine.
Figure 5:
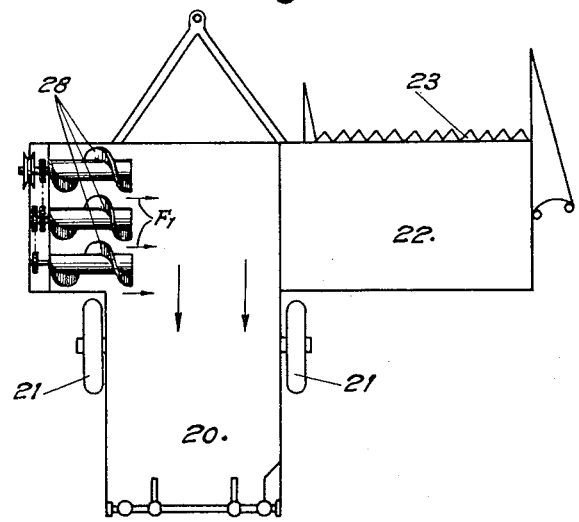

In the alternate form of the invention shown in FIGURES 4 and 5, there is shown at 20 a thresher frame which is mounted on wheels 21. The harvester has an apron 22 which is arranged and supported on one side of the thresher frame and has a cutter bar 23 at its leading end. In this embodiment the apron 22 is an endless conveyor, the upper reach of which moves lengthwise of the cutter bar toward the beater drum 25 (FIGURE 4), which is supported upon the frame 20 for rotation around a substantially horizontal axis parallel with the direction of movement of the machine and transverse of the movement of the conveyors 22 and 24.

The grain, which is cut by the cutter bar 23 of the harvester is displaced laterally by the conveyor apron 22 so as to be subsequently lifted between an inclined extension 22a of said conveyor apron and an endless belt 24 into the space between the rotary beater drum 25 and the concave or grate 26, which is disposed beneath the beater drum. There can be seen at 27 the shaker which is suspended substantially parallel with and laterally of the axis of the beater drum 25 so that it extends longitudinally inside the frame 20 of the thresher.

In accordance with the invention, screw-type conveyors or conveyor worms 28 are mounted above the beater drum 25 and substantially at right angles to the axis of this latter so that they cover practically the entire length of the beater drum. In this example, said screw conveyors are journalled in one of the side walls of the thresher frame 20 and extend transversely inside said frame. One end of each of said conveyors 28 is located directly above the wall portion 20a, which covers part of the drum 25, and the other end of each conveyor 28 is directly above that edge portion of the shaker 27 which is adjacent to the beater drum 25. Said screw conveyors can be rotated, as in the previously described forms of the invention, so that the products received by the screws from the outlet of the passageway housing the beater drum 25 are discharged onto the shaker in the direction of the arrows F1. As in the previous example, a guard plate 29 can be placed above the screw conveyors 28.

It will be understood that structural modifications can be made in the forms of the invention which have been illustrated and described without thereby departing from the scope of the invention. It also follows that the invention can be applied not only to all types of harvester-threshers having a rotary beater drum which is substantially horizontal but in more general manner to all threshers or like machines which are fitted with a beater drum of this type.

What is claimed is:

Threshing apparatus for separating grain kernels from grain, comprising:
 frame structure having passageway means with top and bottom wall means;
 a thrashing cylinder supported upon said frame structure for rotation around a substantially horizontal axis, said top wall means having a portion located directly above and adjacent the upper side of said thrashing cylinder;
 a concave mounted upon said frame structure and located adjacent the periphery of said thrashing cylinder substantially along the lower part of one side thereof for cooperation with said cylinder to perform a thrashing operation;
 a substantially horizontal straw rack supported upon said frame structure and extending radially away from said thrashing cylinder and said passageway;
 a plurality of parallel adjacent screw conveyors mounted on said frame for rotation around substantially horizontal axes and in horizontal alignment directly above, transverse of and adjacent said thrashing cylinder, each conveyor having a screw thread defining, during rotation of the conveyors, a cylinder closely adjacent the cylinder defined by the screw thread on the adjacent conveyor, said cylinders being close to the upper surface of said thrashing cylinder and extending from points directly above and adjacent said portion of said top wall means to points directly above and near said straw rack; and means for effecting rotation of said screw conveyors, whereby said grain is delivered from said thrashing cylinder onto said straw rack.

References Cited by the Examiner
UNITED STATES PATENTS

| | | | |
|---|---|---|---|
| 951,270 | 3/1910 | Eves | 130—27 |
| 1,238,102 | 8/1917 | Cahall | 130—27.5 |
| 2,314,901 | 3/1943 | Scranton | 130—27.5 |
| 2,644,284 | 7/1953 | Oberholtz et al. | 130—27 X |
| 2,652,677 | 9/1953 | Krause et al. | 130—27 X |
| 2,841,945 | 7/1958 | Brenner | 56—20 X |

ABRAHAM G. STONE, *Primary Examiner.*